(12) United States Patent
Hsia

(10) Patent No.: US 6,921,102 B2
(45) Date of Patent: Jul. 26, 2005

(54) ONE-HAND OPERATIONAL CONTROL DEVICE OF FOLDABLE STROLLER

(76) Inventor: Ben Ming Hsia, 10671 Lanark St., Sun Valley, CA (US) 91352

( * ) Notice: Subject to any disclaimer, the term of this patent is extended or adjusted under 35 U.S.C. 154(b) by 9 days.

(21) Appl. No.: 10/756,794

(22) Filed: Jan. 12, 2004

(65) Prior Publication Data

US 2004/0207180 A1 Oct. 21, 2004

Related U.S. Application Data

(63) Continuation-in-part of application No. 10/035,703, filed on Oct. 18, 2001, now abandoned.

(51) Int. Cl.⁷ .................................................. B62B 1/00
(52) U.S. Cl. .......................... 280/642; 74/501.6; 16/900
(58) Field of Search ................................ 280/642, 646, 280/647, 47.38, 650, 657, 658, 38, 39, 641, 639, 655, 655.1; 74/501.6, 551.3; 16/113.1, 900; 190/115, 118

(56) References Cited

U.S. PATENT DOCUMENTS

| | | | | |
|---|---|---|---|---|
| 5,511,441 A | * | 4/1996 | Arai | 74/506.6 |
| 6,129,373 A | * | 10/2000 | Cheng | 280/647 |
| 6,339,862 B1 | * | 1/2002 | Cheng | 16/113.1 |
| 6,442,797 B1 | * | 9/2002 | Yang et al. | 16/113.1 |
| 6,443,479 B2 | * | 9/2002 | Huang | 280/642 |
| 6,485,216 B1 | * | 11/2002 | Cheng | 403/102 |
| 6,827,365 B2 | * | 12/2004 | Yeh | 280/642 |
| 6,860,504 B2 | * | 3/2005 | Suga et al. | 280/642 |

* cited by examiner

Primary Examiner—Bryan Fischmann
(74) Attorney, Agent, or Firm—Raymond Y. Chan; David and Raymond

(57) ABSTRACT

A foldable stroller, incorporating with a one-hand operational control device includes a turn switch rotatably mounted on the stroller. A locking unit includes a locking latch slidably disposed a pusher cavity of the turn switch to lock up a rotational movement of the turn switch and a finger trigger arranged to push the locking latch inwardly into the pusher cavity to unlock the turn switch. In order to fold up the stroller, a user's fingers must grip the finger trigger inwardly to push the locking latch inward, so that the turn switch is unblocked and free to rotate with respect to pivot arms of the stroller to disengage an engagement unit of the stroller.

20 Claims, 8 Drawing Sheets

ONE-HAND OPERATIONAL CONTROL DEVICE OF FOLDABLE STROLLER

CROSS REFERENCE OF RELATED APPLICATION

This application is a Continuation-In-Part of a non-provisional application, application Ser. No. 10/035,703, filed Oct. 18, 2001 now abandoned.

BACKGROUND OF THE PRESENT INVENTION

1. Field of Invention

The present invention relates to strollers, and more particularly to a one-hand operational control device for a stroller to improve both its safety and operability. The folding process of the stroller includes a simple and practical single-action operation by an adult's hand.

2. Description of Related Arts

A stroller is considered as a transportation tool to carry the baby or young child during outdoor activities such as walking and shopping. For convenience, the stroller is preferred to be quickly and easily unfolded for use and folded into a compact unit for carriage so that a user can carry the stroller everywhere.

Referring to FIG. 1, a conventional foldable stroller comprises a supporting frame, a seat frame pivotally supported by the supporting frame, and a U-shaped handle frame pivotally extended from the supporting frame. The foldable stroller further comprises a locking control device for selectively locking and unlocking the stroller in its unfolded position.

As shown in FIGS. 1 and 2A–2D, the locking control device A20 comprises a pair of first locking members A21 provided at two end portions of the handle frame, a pair of second locking members A22 provided on the supporting frame, and an operation unit A30 comprising a turn switch A31 rotatably mounted on the handle frame and a thumb pusher A32 movably mounted on the turn switch A32 in a vertical movable manner, as shown in FIG. 1. FIGS. 2A–2D illustrate different kinds of the first and second locking members A21, A22, B21, B22, C21, C22, D21, D22 of the locking control device A20, B20, C20, D20 for the conventional foldable stroller.

In order to unlock the foldable stroller, the user must intentionally press the thumb pusher A32 downwardly by his or her thumb and rotate the turn switch A31 backwardly simultaneously so as to drive the first locking members A21 to be disengaged with the second locking members A22. Therefore, the user can push the handle frame forwardly to fold up the foldable stroller.

However, such a locking control device has a major drawback in that the user must use his or her thumb to depress the thumb pusher and turn the turn switch by his or her hand at the same time. Due to the muscular structure of the human body, when the user's thumb presses on the thumb pusher, especially for women, the wrist of the user becomes too tense to turn downwards to rotate the turn switch. Similar operational problem occurs when the user has to rotate the turn switch backward and push the handle frame forward in order to fold up the stroller at the same time. Therefore, the user has difficulty operating the two actions of the locking control device at the same time. In other words, the operation of the locking control device is considered disadvantageous in practical use. When the user operates the locking control device improperly, an unwanted injury to the user, such as twisting his or her wrist, may be resulted.

SUMMARY OF THE PRESENT INVENTION

A main object of the present invention is to provide a one-hand operational control device of foldable stroller wherein the stroller is improved both in safety and operability. The operation of the device is smooth and easy since it is designed to fit the muscular structure of the human body.

Another object of the present invention is to provide a one-hand operational control device of foldable stroller wherein the folding process of the foldable stroller includes a simple single-action operation by an adult's hand, wherein the user's thumb push-down operation is avoided and substituted simply by a gripping action with the user's hand that will not block the user's wrist and enables the user's hand to smoothly rotate frontward in order to unlock the stroller.

Another object of the present invention is to provide a one-hand operational control device of foldable stroller which can be quickly and easily folded into a compact unit for carriage and storage and unfolded for use.

Another object of the present invention is to provide a one-hand operational control device of stroller, in which the original structural design of the stroller does not need to be modified, so as to minimize the manufacturing cost for incorporating the one-hand operational control device with the every conventional stroller having a handle frame.

Accordingly, in order to accomplish the above objects, the present invention provides a foldable stroller, comprising:

a foldable supporting frame;

a handle frame comprising two tubular pivot arms extending downwardly;

a pair of folding joints for pivotally connecting two lower ends of the pivot arms to two sides of the supporting frame respectively;

an engagement unit comprising a pair of first engaging members provided at two lower ends of the pivot arms of the handle frame respectively and a pair of second engaging members provided at the two folding joints and securely engaged with the two first engaging members respectively, so as to lock up the handle frame with respect to the supporting frame; and a one-hand operational control device, comprising:

a turn switch comprising a central shaft, having a pusher cavity, firmly and coaxially mounted between two upper ends of the two pivot arms and a turning handle, having a guiding slot, rotatably mounted on the central shaft and arranged to drive the first engaging members disengaged with the second engaging members respectively when the turn switch is rotated with respect to the pivot arms;

a locking unit comprising a locking latch disposed in the pusher cavity of the turn switch in a slidably movable manner and a finger trigger extended from the locking latch to the outside through the guiding slot, wherein the locking latch is arranged to be driven by the finger trigger to move from a normally locking position to an unlocked position; and a resilient unit which is disposed in the pusher cavity for applying an urging pressure against the locking latch so as to normally retain the locking latch at the locking position, wherein in the locking position, a locking portion of the locking latch is extended outwardly to block the turn switch from being rotated with respect to the pivot arms so as to lock the foldable stroller from being folded up, and that in the unlocked position, the locking portion of the locking latch is moved away from the turn switch so as to release the blocking up of the turn switch with respect to the pivot arms, so that the turn switch is capable of being rotated to disengage the first engaging members with the second engaging members in order to fold up the stroller.

DETAILED DESCRIPTION OF THE PREFERRED EMBODIMENT

Figure 1:
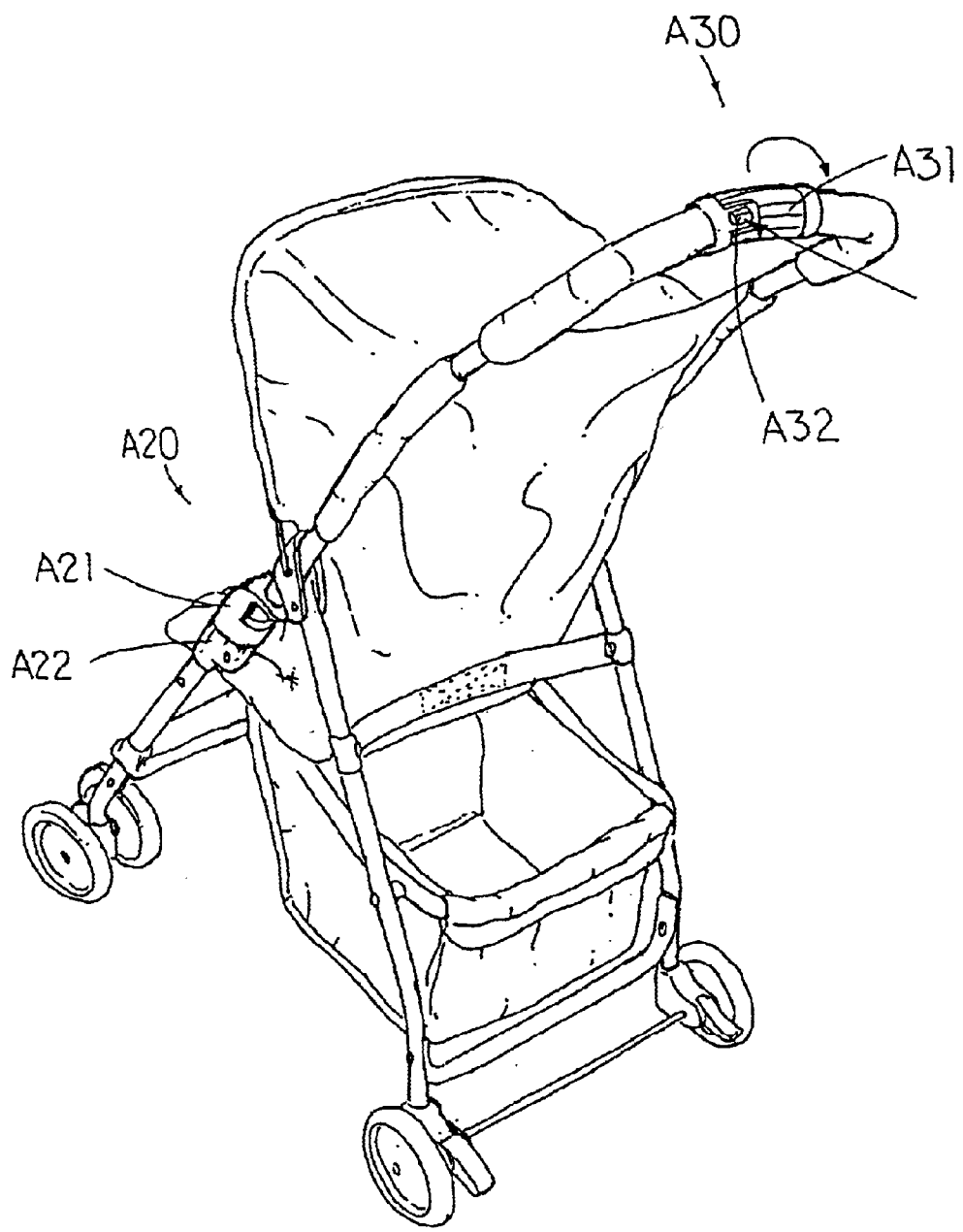
FIG. 1 is a perspective view of a conventional foldable stroller.
Figure 2B:
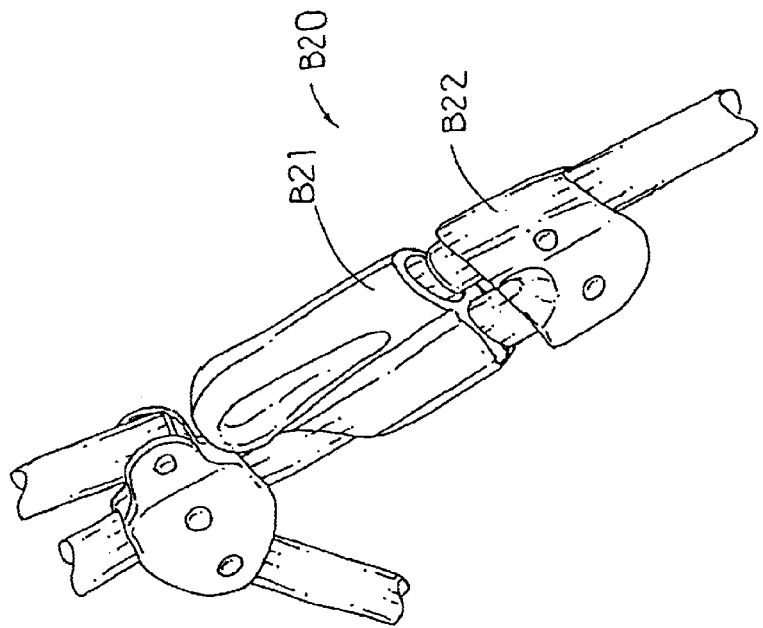
FIG. 2 is a perspective view of a locking control device for the conventional stroller.
Figure 2A:
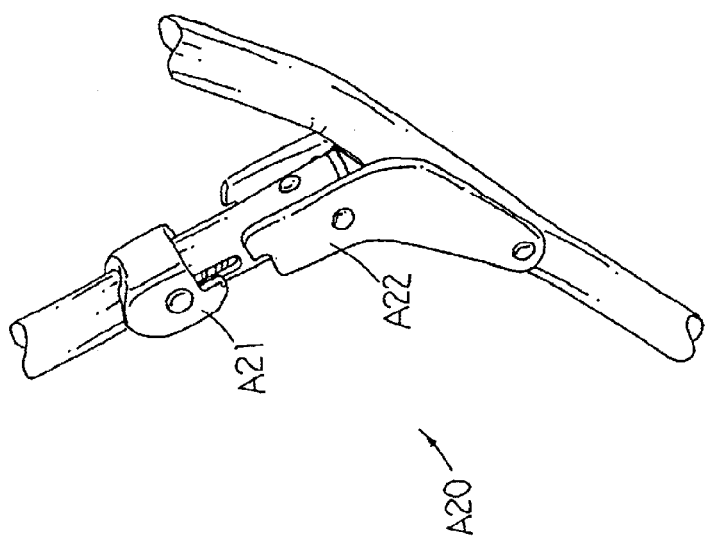
Figure 2D:
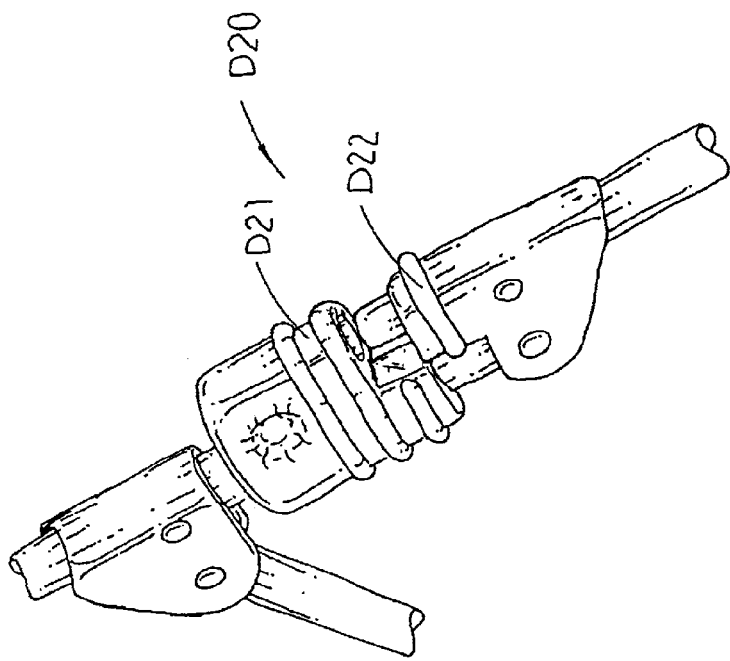
Figure 2C:
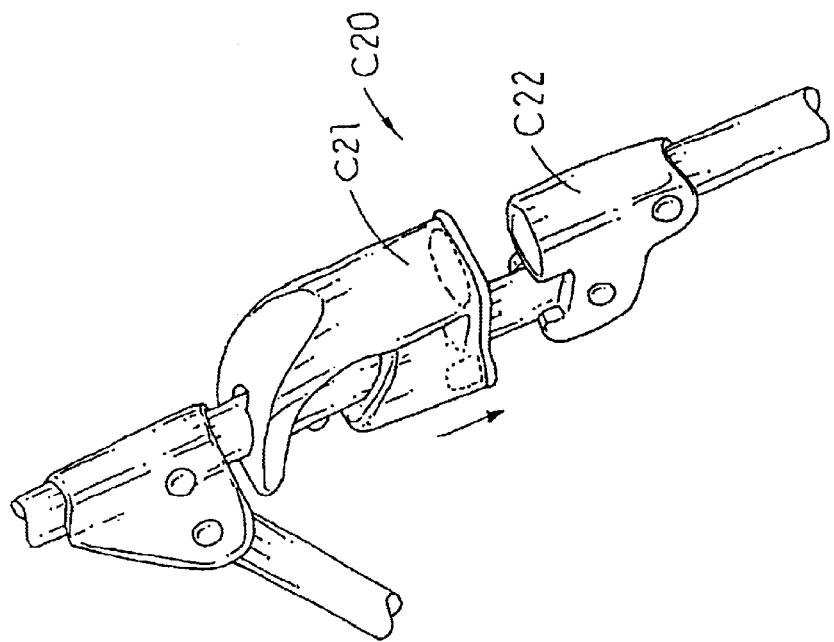
Figure 3:
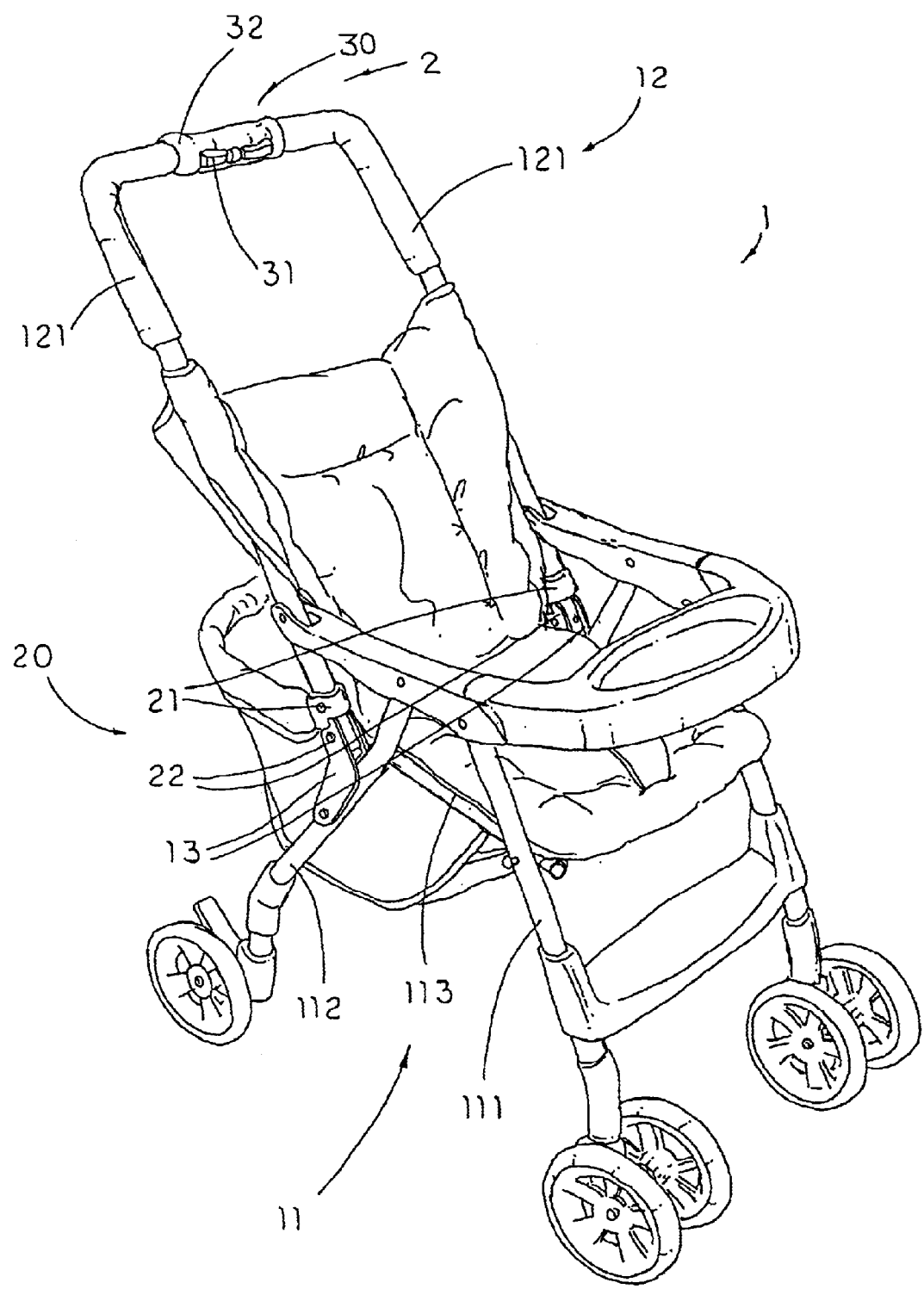
FIG. 3 is a perspective view of a foldable stroller incorporated with a one-hand operational control device according to a preferred embodiment of the present invention.

Referring to FIG. 3 of the drawings, a foldable stroller equipped with a one-hand operational control device 2 according to a preferred embodiment of the present invention is illustrated. The foldable stroller 1, such as a standard foldable stroller, comprises a foldable supporting frame 11, a handle frame 12 comprising two tubular pivot arms 121 extending downwardly, and a pair of folding joints 13 are arranged for pivotally connecting two lower ends of the pivot arms 121 to two sides of the back frame 112 of the supporting frame 11, respectively. The foldable stroller 1 further comprises an engaging unit 20 for securely locking up the handle frame 12 with respect to the supporting frame 11.

The supporting frame 11 comprises a front frame 111, a back frame 112 pivotally connected to the front frame 111, and a seat frame 113 pivotally supported by the front and back frames 111, 112. In order to fold up the foldable stroller 1, the handle frame 12 must be pivotally and forwardly moved to the supporting frame 11, so as to fold up the back frame 112 towards to the front frame 111.

The engagement unit 20 comprises a pair of first engaging members 21 provided at two lower ends of the pivot arms 121 of the handle frame 12 respectively and a pair of second engaging members 22 provided at the two folding joints 13 and securely engaged with the two engaging members 21 respectively, so as to lock up the handle frame 12 with respect to the supporting frame 11.

Figure 4A:
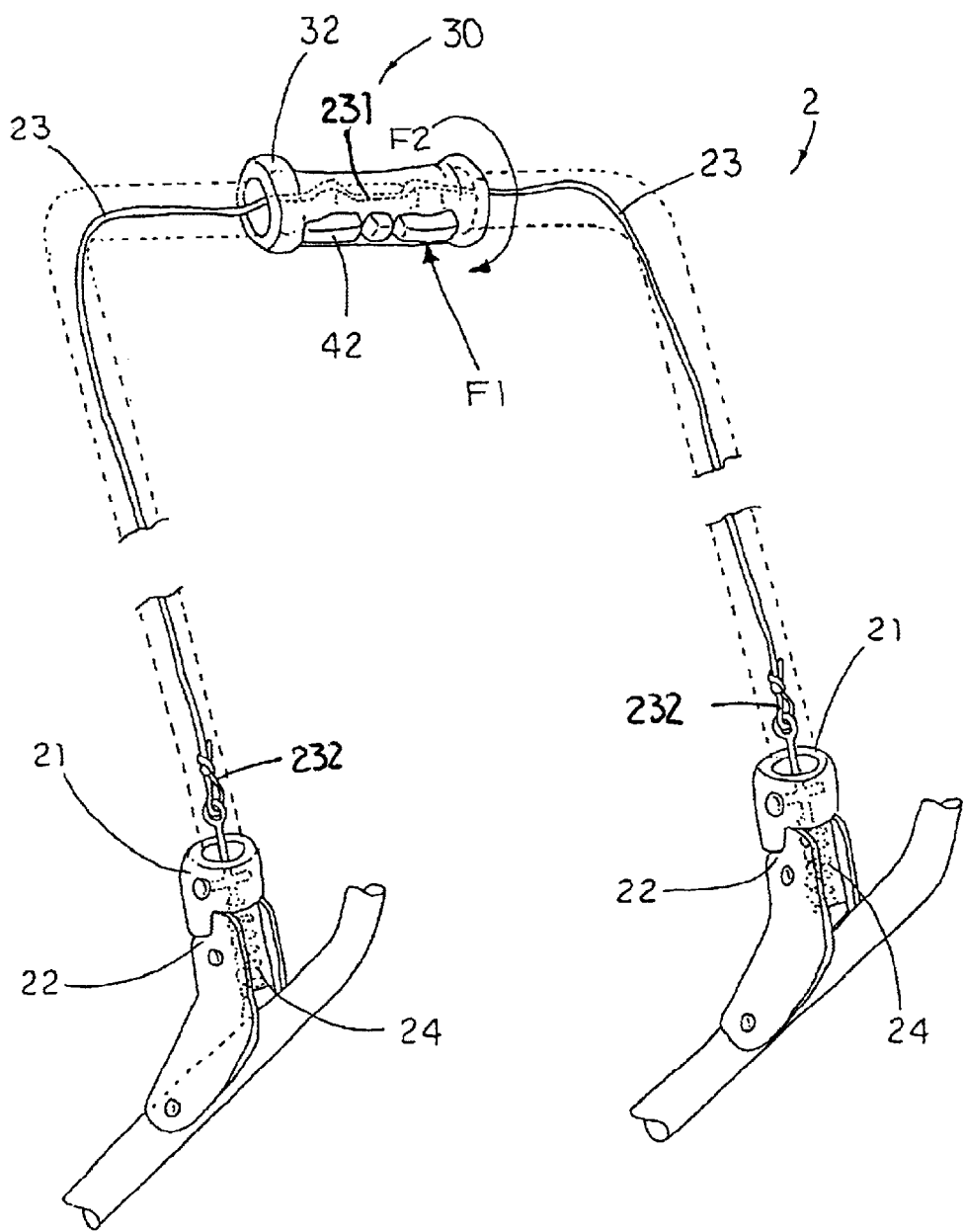
FIG. 4 is a sectional perspective view of the foldable stroller incorporated with the one-hand operational control device according to the above preferred embodiment of the present invention, illustrating the folding operation of the foldable stroller.
Figure 4B:
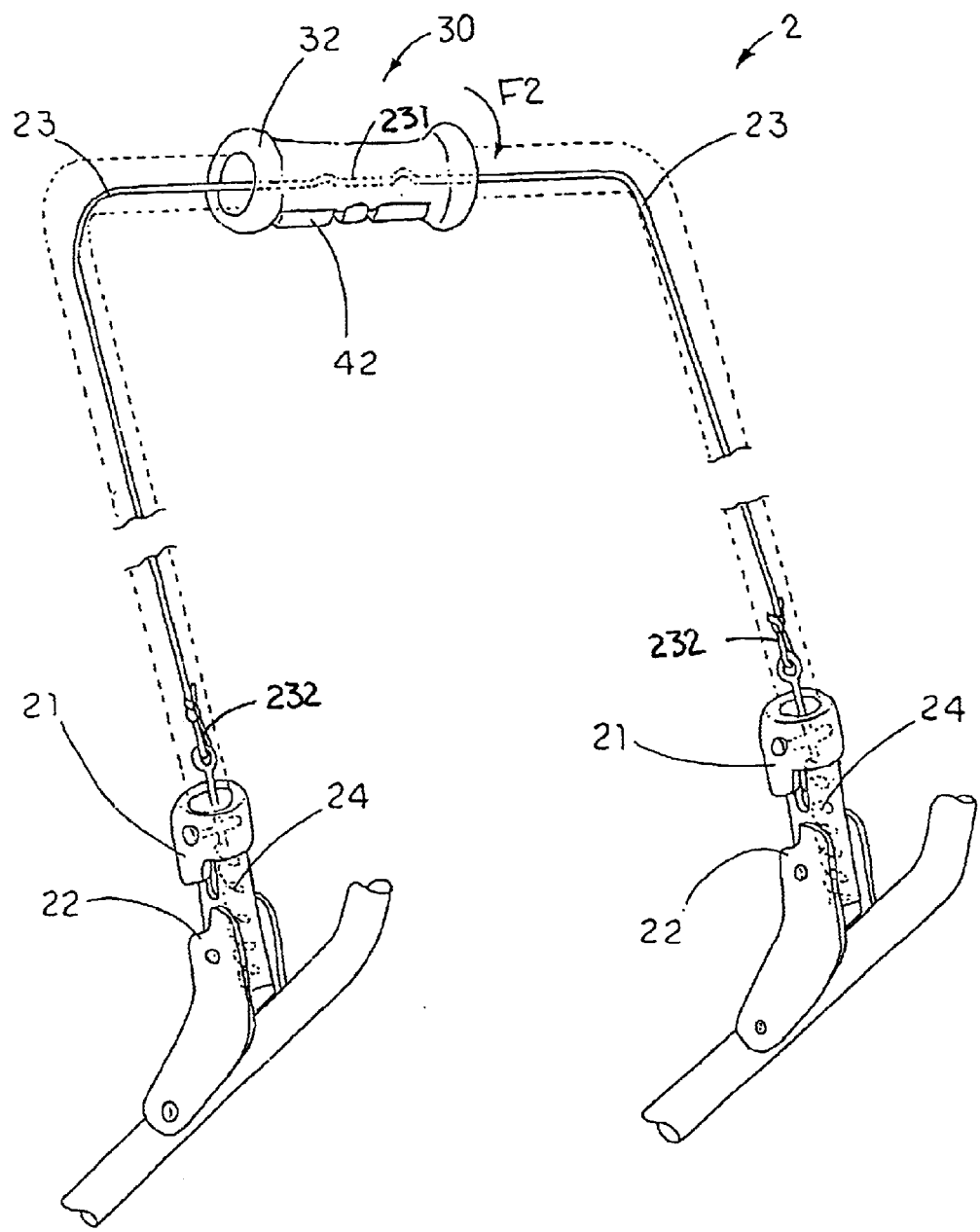
Figure 5:
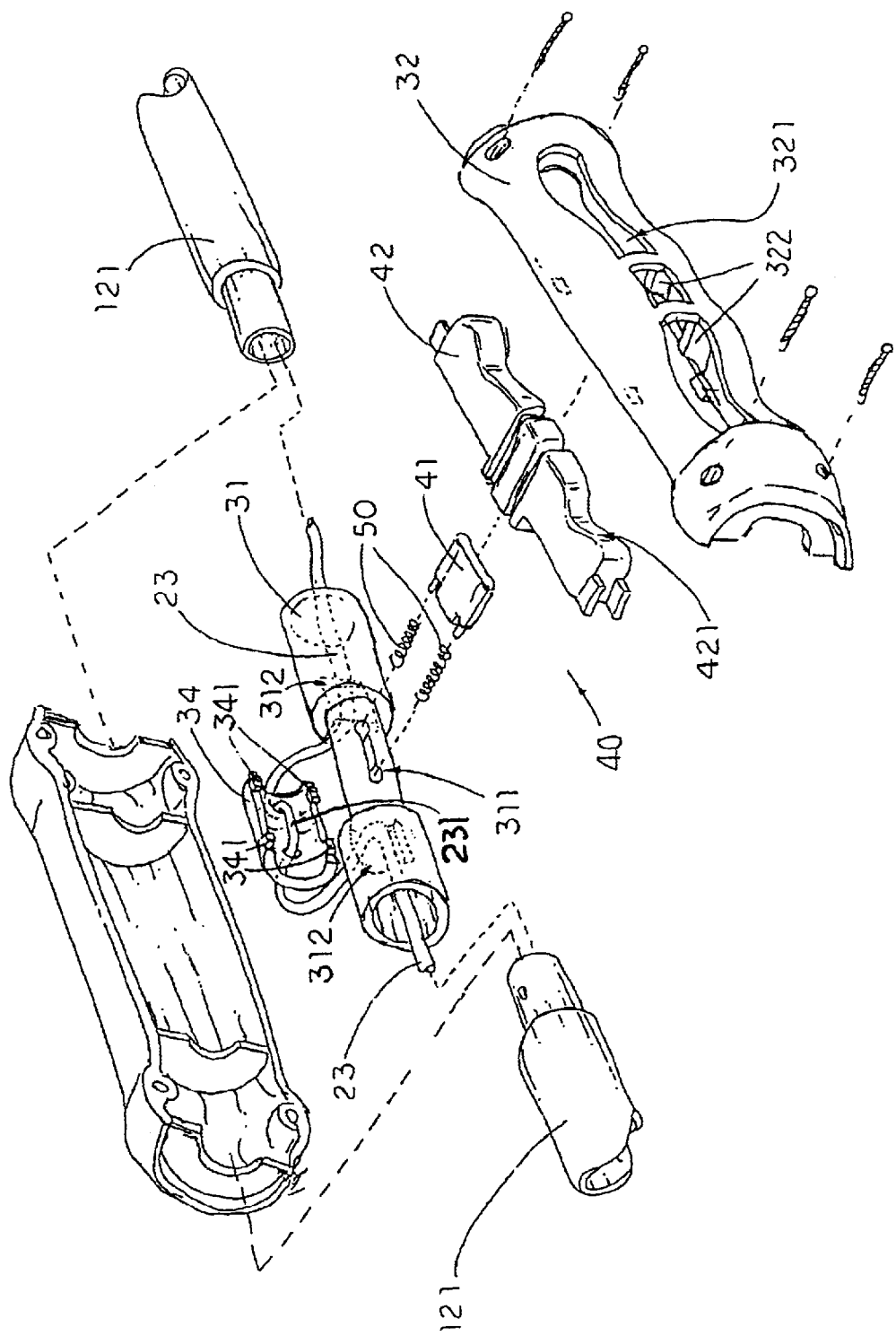
FIG. 5 is an exploded perspective view of the one-hand operational control device of the foldable stroller according to the above preferred embodiment of the present invention.

As shown in FIGS. 4A, 4B and 5, the one-hand operational control device 2 comprises a turn switch 30, a locking unit 40, and a resilient unit 50.

The turn switch 30 comprises a central shaft 31, having a pusher cavity 311, coaxially mounted between two upper ends of the two pivot arms 121 and a turning handle 32, having a guiding slot 321, coaxially and rotatably mounted on the central shaft 31, wherein the turn switch 30 is arranged to drive the first engaging members 21 to disengage with the second engaging members 22 respectively when the turn switch 30 is rotated with respect to the pivot arms 121, as shown in FIGS. 4A and 4B.

The locking unit 40 comprises a locking latch 41 perpendicularly disposed in the pusher cavity 311 of the turn switch 30 in a slidably movable manner and a finger trigger 42 extended from the locking latch 41 to outside through the guiding slot 321, wherein the locking latch 41 is arranged to be driven by the finger trigger 42 to move from a normally locking position to an unlocked position.

The resilient unit 50 is disposed in the pusher cavity 311 for applying an urging pressure against the locking latch 41 so as to normally retain the locking latch 41 in the locking position. In which, in the locking position, a locking portion of the locking latch 41 is extended outwardly to block up the turn switch 30 from being rotated with respect to the pivot arms 121 so as to lock the stroller 1 from being folded up, and that in the unlocked position, the locking portion of the locking latch 41 is moved away from the turn switch 30 so as to release the blocking up of the turn switch 30 with respect to the pivot arms 121. Therefore, the turn switch 30 is capable of being rotated to disengage the first engaging members 21 with the second engaging member 22 in order to folding up the stroller 1.

According to the preferred embodiment, the engagement unit 20 further comprises at least an elongated element 23 and a pair of auto-returning elements 24 for applying an urging pressure against the first engaging members 21 to normally engage with the second engaging members 22 respectively.

The elongated element 23 has a middle affixing portion 231 coupled with the turning handle 32 of the turn switch 30 and a control end 232 firmly connected to the respective first engaging member 21 in such a manner that when the turning handle 32 is rotated with respect to the central shaft 31, the first engaging members 21 are disengaged with the second engaging members 22 respectively via the elongated element 23, as shown in FIGS. 4A and 4B.

As shown in FIGS. 4 and 5, the central shaft 31 further has two windows 312 formed thereon to communicate an interior of the central shaft 31 with outside, wherein the two control ends 232 of the elongated element 23 are extended into the interior of two end portions of the central shaft 31 via the windows 312 and inserted through the pivot arms 121 to engage with the first engaging members 21 respectively. In other words, the control ends 232 of the elongated element 23 pass through the windows 312 and the pivot arms 121 to reach and engage with the first engaging members 21 respectively.

Each of the auto-returning elements 24, which is a resilient element such as compression spring, mounted between the first engaging member 21 and the pivot arm 121. The auto-returning element has two ends biasing against the first engaging member 21 and the pivot arm 121 so as to push the first engaging member 21 to a position that the first engaging member 21 is engaged with the second engaging member 22.

The turning handle 32 is coaxially and rotatably mounted on the central shaft 31 and has a size and shape adapted for being fittedly gripped by a hand of a user to rotate the turning handle 32 with respect to the pivot arms 121. The turning handle 32 further has at least a blocking wall 322 inwardly extended from an inner surface of the turning handle 32 towards to the pusher cavity 311.

The turn switch 30 further comprises a driving member 34 rotatably connected to the central shaft 31, wherein the driving member 34 has at least a protrusion 341 extended outwardly and engaged with the turning handle 32 so as to ensure the turning handle 32 being rotated with respect to the central shaft 31. The central shaft 31 can be integrally extended between two ends of the pivot arms 121 of the handle frame 12 to form a one-piece member, so as to rigidly support the turning handle 32 in a rotatably movable manner.

According to the preferred embodiment as shown in FIGS. 4A, 4B and 5, the middle affixing portion 231 is attached to the driving member 34 so as to couple with the turning handle 32.

Alternatively, the elongated element 23 can be two durable wires each having an affixing end connected to the driving member 34 and another end functioned as the control end 232 extending from the central shaft 31 to the respective first engaging member 21 and passing through the respective pivot arm 121. It is worth to mention that the two affixing ends of the two durable wires or the middle affixing portion 231 of the elongated element 23 of the preferred embodiment can be substantially affixed to the driving member 34 so as to drive the first engaging members 21 to disengage with the second engaging members 22 respectively.

As shown in FIGS. 4A and 4B, the turning handle 32 must be rotated forward in order to drive the first engaging members 21 to disengage with the second engaging members 22 via the elongated element 23 respectively while folding up the foldable stroller 1. In other words, the forward rotational operation of the turn switch 30 has the same direction of the forward folding operation of the handle frame 12 so as to enhance the folding operation of the foldable stroller 1.

According to the preferred embodiment, the locking latch 41 is slidably fitted in the pusher cavity 311 in a perpendicularly movable manner with respect to the central shaft 31 and an outer end of the locking latch 41 functions as the locking portion. In the normal locking position, the outer end (locking portion) of the locking latch 41 is normally extended towards the blocking walls 322 of the turning handle 32 in order to block the turning handle 32 from being rotated with respect to the pivot arms 121.

Figure 6:
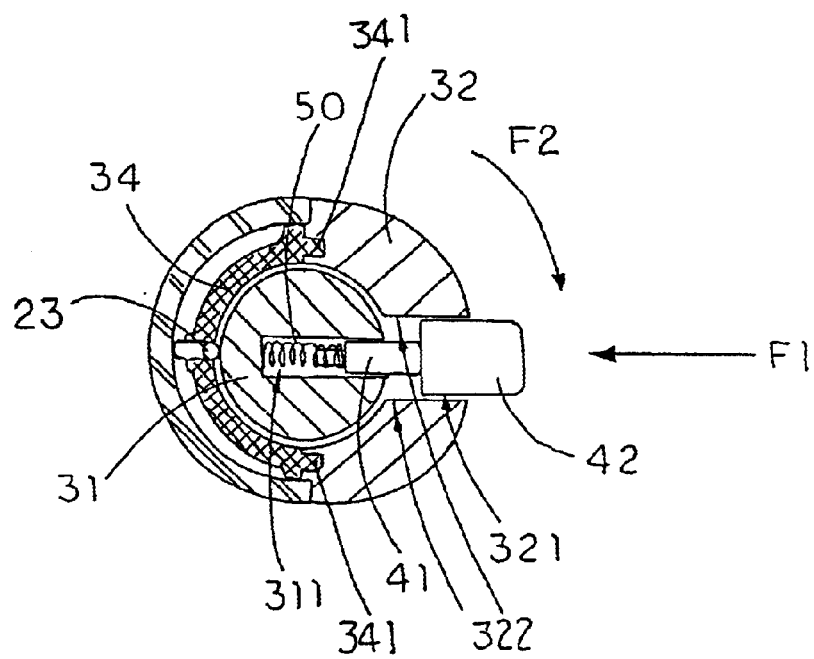
FIG. 6 is a sectional view of the one-hand operational control device of the foldable stroller in a normally locking position according to the above preferred embodiment of the present invention.
Figure 7:
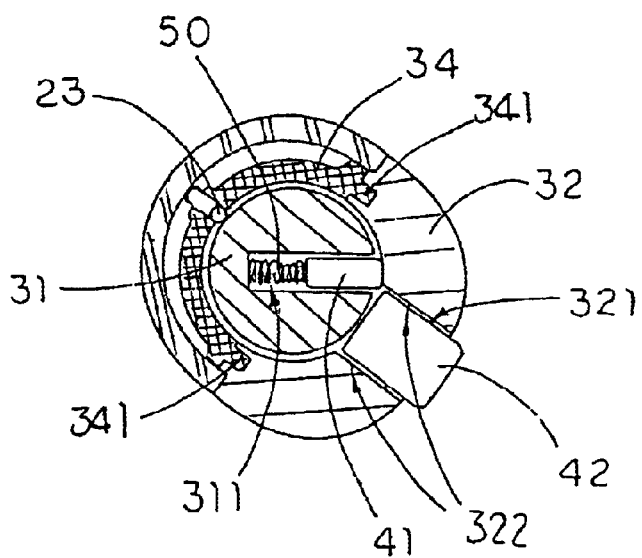
FIG. 7 is a sectional view of the one-hand operational control device of the foldable stroller in an unlocked position according to the above preferred embodiment of the present invention.

As shown in FIGS. 6 and 7, the pusher cavity 311 has a predetermined depth and the locking latch 41 is pushed inward enough to move away from the blocking wall 322 of the turning handle 32.

The resilient unit 50, according to the preferable embodiment of the present invention, comprises at least a compression spring which is disposed in the pusher cavity 311 and is provided between a bottom surface of the pusher cavity 311 and the locking latch 41. The resilient unit 50 has two ends biased against the locking latch 41 and the bottom surface of the pusher cavity 311. Accordingly, the resilient unit 50 will normally urge and retain the locking latch 41 in an outer position that the outer end of the locking latch 41 is extended to the blocking wall 322 of the turning handle 32 to block the turning handle 32 from being rotated with respect to the pivot arms 121, so as to lock the foldable stroller from being folded up.

The finger trigger 42 is slidably mounted on the turning handle 32 through the guiding slot 321 and arranged to inwardly move the locking latch 41 into the pusher cavity 311 until the outer end of the locking latch 41 is moved away from the blocking wall 322 of the turning handle 32. For enhancing the operability of one-hand operational control device 2, the finger trigger 42 has a W-shape to form a W-shaped gripping surface 421 for the user's fingers fittedly gripping thereon.

In order to unlock the one-hand operational control device 2, the user must intentionally grip the finger trigger 42 by his or her fingers and apply an inward force F1 on the finger trigger 42 in order to inwardly move the locking latch 42 until the outer end of the locking latch 42 is moved away from the blocking wall 322 of the turning handle 32. In this unlocked position, a forward rotational force F2 can be applied on the turning handle 32 to rotate forward to drive the first engaging members 21 to disengage with the second members 22 respectively. Therefore, the user can pivotally push the handle frame 12 towards to the supporting frame 11 to fold up the foldable stroller 1. According to the human body structure, the user can easily grip on the finger trigger 42 to press it inward, rotate the turn switch 30 to unlock the foldable stroller 1, and push the handle frame 12 to fold up the foldable stroller 1 in a single continuous motion.

While releasing the forward rotational force F2, the auto-returning element 24 will rebound to its original form which rotatably pushes the turning handle 32 rearwardly to the original position. Furthermore, the compressed resilient unit 50 will then rebound outwardly and force the locking latch 41 to extend to the blocking wall 322 of the turning handle 32, so as to remain the locking latch 41 in its original lock-up position.

What is claimed is:

1. A foldable stroller, comprising:

a foldable supporting frame;

a handle frame comprising two pivot arms extending downwardly;

two folding joints for pivotally connecting two lower ends of said pivot arms to two sides of said supporting frame respectively;

an engagement unit comprising two first engaging members provided at two lower ends of said pivot arms of said handle frame respectively and two second engaging members provided at said two folding joints and securely engaged with said two first engaging members respectively, so as to lock up said handle frame with respect to said supporting frame; and a one-hand operational control device, said one-hand operational control device comprising:

a turn switch which is arranged to drive said first engaging members to disengage with said second engaging members respectively, said turn switch comprising a central shaft and a turning handle, wherein said central shaft has a pusher cavity and is firmly and coaxially mounted between two upper ends of said pivot arms, wherein said turning handle, which has a guiding slot and one or more blocking walls inwardly extended towards said pusher cavity, is rotatably and coaxially mounted on said central shaft and arranged to drive said first engaging members to disengage with said second engaging members respectively;

a locking unit comprising a locking latch disposed in said pusher cavity of said turn switch in a slidably movable manner and a finger trigger extended from said locking latch to outside through said guiding slot; and a resilient unit, which is disposed in said pusher cavity, applying an urging pressure against said locking latch so as to normally retain said locking latch in a locking position, wherein in said locking position, a locking portion of said locking latch is extended outwardly and blocked by said blocking walls to block any rotation of said turn switch, so as to lock said foldable stroller from being folded up;

wherein said locking latch is arranged to be driven by said finger trigger to move from said locking position to an unlocked position, wherein in said unlocked position, said locking portion of said locking latch is moved away from said blocking walls of said turn switch so that said turn switch is unblocked and free to rotate with respect to said pivot arms to disengage said first engaging members with said second engaging members respectively.

2. A foldable stroller, as recited in claim 1, wherein said locking latch is slidably fitted in said pusher cavity in a perpendicularly movable manner with respect to said central shaft, wherein said resilient unit is provided between a bottom surface of said pusher cavity and said locking latch to urge and retain said locking latch in an outer position that an outer end of said locking latch is extended to said blocking walls of said turning handle so as to block said turning handle from being rotated with respect to said pivot arms, wherein said finger trigger is arranged to inwardly move said locking latch into said pusher cavity until said outer end of said locking latch is moved away from said blocking wall of said turning handle.

3. A foldable stroller, as recited in claim 2, wherein said engagement unit further comprises at least an elongated element coupled with said turning handle of the turn switch and provided with two control ends extended to firmly connect with said first engaging members respectively in such a manner that when said turning handle is rotated forward with respect to said pivot arms, said first engaging members are disengaged with said second engaging members respectively via said elongated element.

4. A foldable stroller, as recited in claim 3, wherein said central shaft further has two windows formed thereon to communicate with an interior of said central shaft, wherein said two control ends of the elongated element are extended into said interior of said central shaft via said windows and pass through said pivot arms to engage with said first engaging members respectively.

5. A foldable stroller, as recited in claim 4, wherein said supporting frame comprises a front frame, a back frame pivotally connected to said front frame and a seat frame pivotally supported by said front and back frames in such a manner that when said handle frame is pivotally moved forward, said back frame is arranged to pivotally fold towards to said front frame so as to fold up said foldable stroller.

6. A foldable stroller, as recited in claim 5, wherein said finger trigger has a W-shape to form a W-shaped gripping surface for allowing a user's fingers to fittedly grip thereon.

7. A foldable stroller, as recited in claim 6, wherein said turn switch further comprises a driving member coupled with said turning handle and said elongated element is attached to said driving member, wherein said driving member has at least a protrusion outwardly extended and engaged with said turning handle so as to ensure said turning handle to be rotated with respect to said central shaft.

8. A foldable stroller, as recited in claim 5, wherein said turn switch further comprises a driving member coupled with said turning handle and said elongated element is attached to said driving member, wherein said driving member has at least a protrusion outwardly extended and engaged with said turning handle so as to ensure said turning handle to be rotated with respect to said central shaft.

9. A foldable stroller, as recited in claim 4, wherein said finger trigger has a W-shape to form a W-shaped gripping surface for allowing a user's fingers to fittedly grip thereon.

10. A foldable stroller, as recited in claim 4, wherein said turn switch further comprises a driving member coupled with said turning handle and said elongated element is attached to said driving member, wherein said driving member has at least a protrusion outwardly extended and engaged with said turning handle so as to ensure said turning handle to drive said central shaft to rotate.

11. A foldable stroller, as recited in claim 3, wherein said supporting frame comprises a front frame, a back frame pivotally connected to said front frame and a seat frame pivotally supported by said front and back frames in such a manner that when said handle frame is pivotally moved forward, said back frame is arranged to pivotally fold towards to said front frame so as to fold up said foldable stroller.

12. A foldable stroller, as recited in claim 11, wherein said turn switch further comprises a driving member coupled with said turning handle and said elongated element is attached to said driving member, wherein said driving member has at least a protrusion outwardly extended and engaged with said turning handle so as to ensure said turning handle to be rotated with respect to said central shaft.

13. A foldable stroller, as recited in claim 3, wherein said finger trigger has a W-shape to form a W-shaped gripping surface for allowing a user's fingers to fittedly grip thereon.

14. A foldable stroller, as recited in claim 3, wherein said turn switch further comprises a driving member coupled with said turning handle and said elongated element is attached to said driving member, wherein said driving member has at least a protrusion outwardly extended and engaged with said turning handle so as to ensure said turning handle to drive said central shaft to rotate.

15. A foldable stroller, as recited in claim 2, wherein said supporting frame comprises a front frame, a back frame pivotally connected to said front frame and a seat frame pivotally supported by said front and back frames in such a manner that when said handle frame is pivotally moved forward, said back frame is arranged to pivotally fold towards to said front frame so as to fold up said foldable stroller.

16. A foldable stroller, as recited in claim 2, wherein said finger trigger has a W-shape to form a W-shaped gripping surface for allowing a user's fingers to fittedly grip thereon.

17. A foldable stroller, as recited in claim 1, wherein said engagement unit further comprises at least an elongated element coupled with said turning handle of the turn switch and provided with two control ends extended to firmly connect with said first engaging members respectively in such a manner that when said turning handle is rotated forward with respect to said pivot arms, said first engaging members are disengaged with said second engaging members respectively via said elongated element.

18. A foldable stroller, as recited in claim 17, wherein said central shaft further has two windows formed thereon to communicate with an interior of said central shaft, wherein said two control ends of the elongated element are extended into said interior of said central shaft via said windows and pass through said pivot arms to engage with said first engaging members respectively.

19. A foldable stroller, as recited in claim 1, wherein said supporting frame comprises a front frame, a back frame pivotally connected to said front frame and a seat frame pivotally supported by said front and back frames in such a manner that when said handle frame is pivotally moved forward, said back frame is arranged to pivotally fold towards to said front frame so as to fold up said foldable stroller.

20. A foldable stroller, as recited in claim 1, wherein said finger trigger has a W-shape to form a W-shaped gripping surface for allowing a user's fingers to fittedly grip thereon.

* * * * *